United States Patent [19]
Baumann et al.

[11] Patent Number: 5,785,367
[45] Date of Patent: Jul. 28, 1998

[54] BUMPER

[75] Inventors: Karl-Heinz Baumann, Bondorf; Andreas Otto, Heimsheim; Klaus Rathje, Boeblingen, all of Germany

[73] Assignee: Mercedes-Benz AG, Stuttgart, Germany

[21] Appl. No.: 625,896

[22] Filed: Apr. 1, 1996

[30] Foreign Application Priority Data

Mar. 31, 1995 [DE] Germany .................. 195 11 868.5

[51] Int. Cl.[6] .................................................. B62D 27/04
[52] U.S. Cl. ............................................ 293/133; 293/155
[58] Field of Search .................................. 293/133, 155;
188/376, 377; 296/188, 189

[56] References Cited

U.S. PATENT DOCUMENTS

| 3,912,295 | 10/1975 | Eggert, Jr. ............... | 293/133 |
|---|---|---|---|
| 4,023,652 | 5/1977 | Torke ..................... | 188/377 |
| 4,152,012 | 5/1979 | Reidelbach et al. ....... | 293/133 |
| 4,272,114 | 6/1981 | Hirano et al. ........... | 293/133 |
| 5,150,935 | 9/1992 | Glance et al. . | |

FOREIGN PATENT DOCUMENTS

| 2626724 | 12/1977 | Germany . |
|---|---|---|
| 3510590C2 | 10/1986 | Germany . |
| 3626150A1 | 2/1988 | Germany . |
| 41-22334 (A) | 8/1974 | Japan . |
| 1-130853 (A) | 9/1989 | Japan . |
| 2-175452 (A) | 7/1990 | Japan . |
| 3-49146 (A) | 5/1991 | Japan . |
| 3-77746 (A) | 8/1991 | Japan . |
| 4-154456 (A) | 5/1992 | Japan . |
| 4-310446 (A) | 11/1992 | Japan . |
| 5-12303 (A) | 2/1993 | Japan . |
| 5-77681 (A) | 3/1993 | Japan . |
| 5-80918 (A) | 11/1993 | Japan . |
| WO95/02525 | 1/1995 | WIPO . |

OTHER PUBLICATIONS

Patent Abstracts of Japan, 5-319186(A), Dec. 3, 1993, Bumpr for Vehicle.
Patent Abstracts of Japan, 6-171443(A), Jun. 21, 1994, Mounting Structure of Bumper for Vehicle.

Primary Examiner—Ed L. Swinehart
Attorney, Agent, or Firm—Evenson, McKeown, Edwards & Lenahan, P.L.L.C.

[57] ABSTRACT

The invention relates to a bumper for a vehicle body having two side members (11, 12), said bumper consisting of a bumper bracket (13) extending over the width of the body, with two deformation members (14, 15) projecting at right angles from the back at a distance from one another, said members being integral with bumper bracket (13) and being connectable by bolt connections (20) with side members (11, 12). The deformation members (14, 15) are more resistant to deformation than bumper bracket (13), so that they deform to absorb additional energy only when the ability of bumper bracket (13) to deform is exhausted.

28 Claims, 3 Drawing Sheets

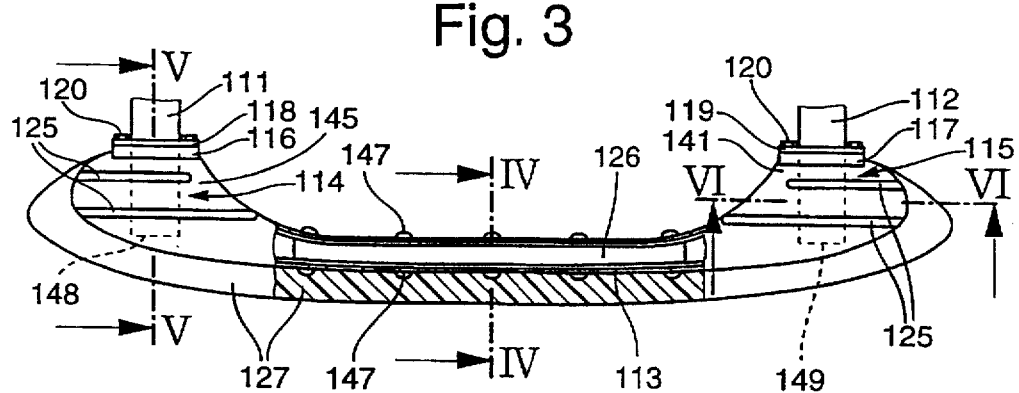
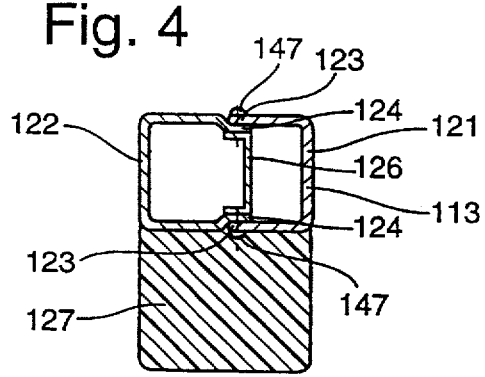
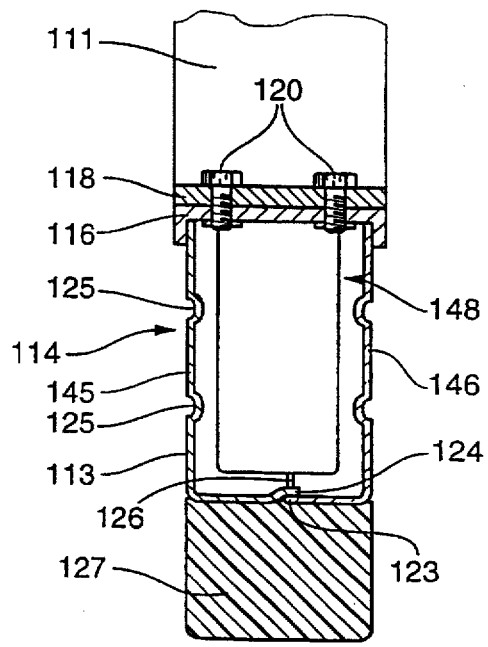
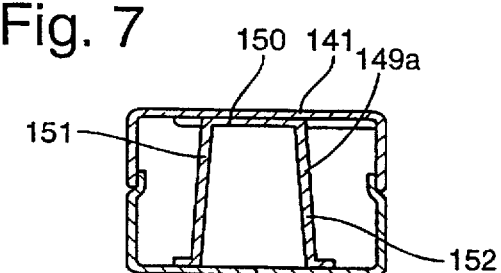
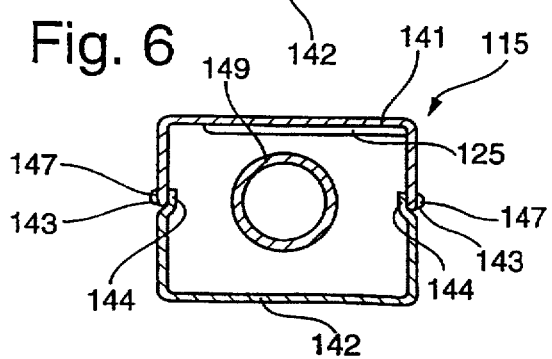

BUMPER

BACKGROUND AND SUMMARY OF THE INVENTION

The invention relates to a bumper, and more particularly to a bumper for a vehicle body having two side members, the bumper having a bumper bracket extending over the width of the vehicle body with two deformation members mounted at a distance from one another on a back side of the bumper bracket facing the vehicle body, the deformation members being made more resistant to deformation than the bumper bracket so that they deform only after the bumper bracket has deformed.

In a bumper known from German patent document DE 36 26 150 A1, the deformation members are made in the form of oval rings of glass-fiber-reinforced plastic, with the lengthwise central axis of the deformation member extending vertically and the deformation member having one wall abutting the side member of the vehicle body and the opposite wall abutting the back of the bumper bracket and being mounted releasably by bolts. The deformation members thus formed are intended for absorption and exhibit the special property of not breaking when overloaded but of absorbing energy by delamination of the individual fiber layers. The purpose of this property is that the side members can be largely protected against damage at impact speeds above the design speed for the bumper. The bumper bracket is designed as a box girder with a closed hollow cross section and is likewise made of glass-fiber-reinforced plastic, with transverse reinforcement being provided by endless fibers or fabric to absorb torsion forces and transverse shear. The cavity in the bumper bracket can also be filled with foam. In a minor collision, only the deformation members are deformed for the most part, so that repair can be limited to replacing the deformation members, which can be accomplished relatively simply by virtue of the bolt mounting. In a more serious collision, both the deformation members and the bumper bracket are deformed. In addition, a bumper of the initially described type is known from German patent document DE 26 25 724 A1, in which the deformation members consist of hollow bodies whose lengthwise central axes are extensions of the side members, with the deformation members likewise being fastened releasably by bolts to the side members and bumper bracket. The bumper bracket consists of a C-profile whose opening facing the side members is closed by a flat panel.

The energy absorption capacity of the bumper described above before the side member is damaged is relatively limited, so that damage to the side members can only be avoided in collisions at very low speeds, up to 5 km/h for example. In addition, the deformation members are insufficiently able to absorb energy from diagonal impacts directed at an angle to them.

A bumper is known from German patent document DE 35 10 590 C2 that is assembled from two half shells and is mounted directly on the side members of the vehicle body. The legs of the U-shaped half shells decrease in width toward the free ends of the bumper, so that the two half shells are located opposite one another in their original positions before they are joined in such fashion that following endwise contact between the legs in the middle of the bumper, a gap remains between them that continuously widens toward the ends. For welding, the two half shells are tensioned against one another so that the gap is closed. Stresses then develop in the half shells which contribute to strengthening the bumper and have a favorable effect on its stability under stress.

The goal of the invention is to provide a bumper of the initially described type with much greater energy absorption capacity.

This and other goals have been achieved according to the present invention by providing a bumper bracket which is assembled from half shells which abut one another within a separating plane that extends essentially horizontally in a mounted position and which are connected to one another by flanges, wherein the half shells each have half shell wall parts facing the vehicle body which form the two deformation members, the half shell wall parts being made in one piece with the half shells and projecting transversely therefrom, and the half shell wall parts forming hollow bodies integral with the bumper brackets and resistant to deformation when in the mounted position.

The bumper according to the invention has the advantage that it can absorb very much greater impact energy without the side members being deformed than the known bumper initially described, since the deformation members, being stiffer than the bumper bracket, initially keep any impact energy from reaching the side members and it is only after the collapse of the bumper bracket that the members absorb energy. Hence, impacts that occur at vehicle speeds of up to 15 km/h can be absorbed without damaging the side members. Inexpensive structural repair of the vehicle following such an impact is possible without any welding or straightening work by simply replacing the bumper. The fact that the deformation members form one-piece deformation-resistant hollow bodies together with the bumper bracket permits greater energy absorption because of the larger cross sections involved. In addition the requirements for a large-volume and bending-resistant structure in designing deformation members that are made integral with the bumper bracket, which can be designed to meet the requirements in such fashion that energy absorption is largely independent of the direction of the stress, so that controlled deformation is possible even with diagonal impacts.

Advantageous embodiments, suitable improvements, and designs of the bumper according to the invention are described in the other claims.

The flanges of the two half shells can run horizontally or vertically, with the flanges resting on one another in the horizontal position and with the flanges fitting over one another in the vertical direction in the vertical position. Alignment of the flanges has the advantage that the half shells can be manufactured with a single tool. This applies even when the shapes of the half shell wall parts that form the deformation members differ to a greater degree in these areas from the remaining area of the bumper bracket, for example from its central area.

By constructing the bumper with reinforcing parts located in the bumper bracket and/or the deformation members, the stiffness of the bumper under flexure and its resistance to changing shape can be deliberately influenced. By arranging a horizontal reinforcing part in the bumper bracket to form a two-chambered cross-sectional profile, the bumper bracket can be subjected to even higher stresses, for example in the bending area between the side member connections.

By aligning deformation elements in the direction of respective side members and abutting the vehicle body at one end, and designing the reinforcing parts as profiles, hollow bodies, solid bodies, or vertical and horizontal supporting walls, the energy absorption capacity of the deformation members can be increased and deliberately influenced in this respect depending on the type, shape, and dimensions of the reinforcing parts.

The deformation characteristic of the deformation members and of the bumper bracket can be influenced by providing lock beads lock beads are provided in the half shells, particularly in the area of the deformation members.

In one preferred embodiment, the bumper is constructed in a lobular shape. This shaping to form the deformation members can also be defined as flaring, which serves as a deformation zone and for greater energy absorption by larger cross sections, and means that energy absorption by large-volume design which is insensitive to bending is largely independent of the direction of the load, in other words specific deformation in the area of the deformation members is possible even with diagonal impacts.

In another preferred embodiment, the half shell wall parts of the half shells that form the deformation members are designed as lengthwise parts projecting approximately at right angles and pointing toward the vehicle body.

In yet another preferred embodiment, the bumper bracket and the deformation members are each made as extrusion-molded profiles and wherein the extrusion-molded profiles are connected together by bolting, riveting, gluing, or welding. By virtue of this design in the form of a box-shaped extrusion-molded profile for both the bumper bracket and for the deformation members, a much greater energy absorption capacity can be achieved, likewise with low cost and weight.

These and other objects, features and advantages of the present invention will become more readily apparent from the following detailed description when taken in conjunction with the accompanying drawings.

BRIEF DESCRIPTION OF THE DRAWINGS

FIG. 3 is a schematic, partially horizontally sectioned top view of a bumper according to a second embodiment;

FIG. 4 is a schematic sectional view along line IV—IV in FIG. 3;

FIG. 5 is a schematic sectional view along line V—V in FIG. 3;

FIG. 6 is a schematic sectional view along line VI—VI in FIG. 3;

FIG. 7 is a schematic sectional view roughly corresponding to that in FIG. 6, of an embodiment modified with respect to the latter;

DETAILED DESCRIPTION OF THE DRAWINGS

Figure 1:
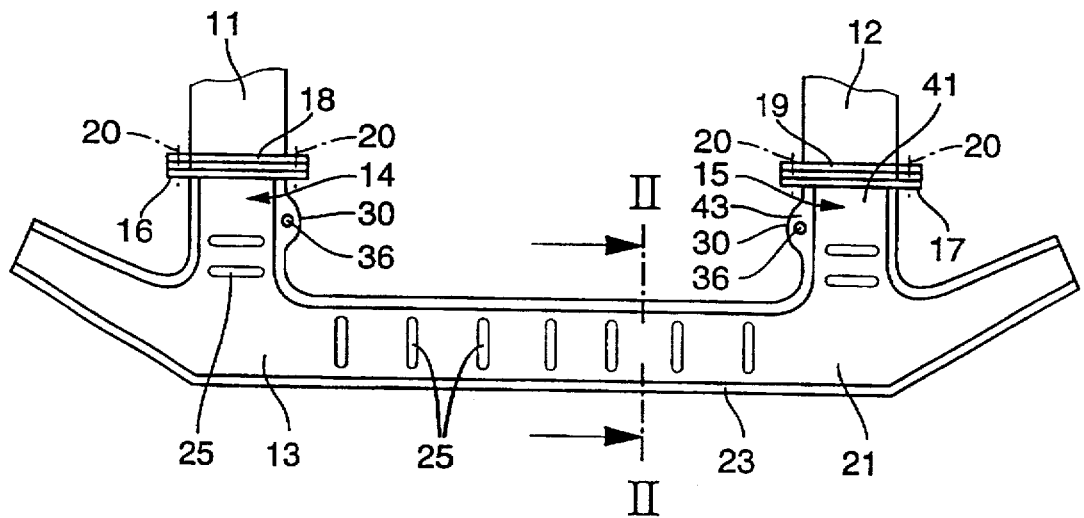
FIG. 1 is a schematic top view of a bumper according to a first embodiment for a vehicle body with two side members.
Figure 2:
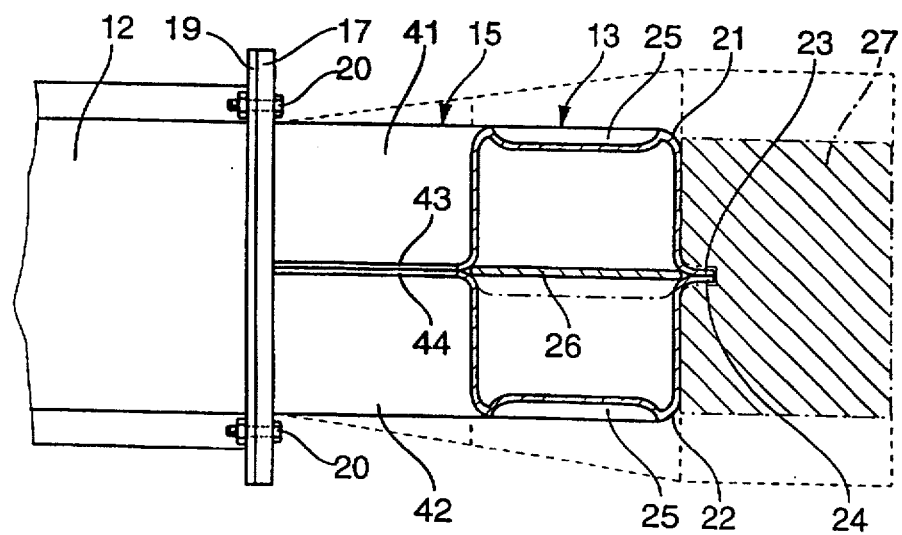
FIG. 2 is a schematic sectional view along line II—II in FIG. 1.

The bumper shown in FIGS. 1 and 2 is designed to be attached to a vehicle body, specifically to its side members 11 and 12. The bumper can be located on the front or rear ends of the two side members 11, 12. The bumper has a bumper bracket 13 with two deformation members 14, 15 projecting transversely therefrom, for example at right angles, said members being integral with bumper bracket 13. At the free ends of deformation members 14, 15, mounting flanges 16, 17 are provided, e.g. molded, said flanges abutting matching flanges 18, 19 on side members 11, 12 and being firmly connected therewith by bolt connections 20, and being disconnectable from said members by said connections.

The bumper, specifically bumper bracket 13 with the two deformation members 14, 15 integral therewith, is assembled from two essentially identical half shells 21, 22 abutting one another within a separating plane that runs horizontally in the mounting position and contacting one another by means of surrounding flanges 23, 24 that extend horizontally in the first embodiment and are firmly connected to one another by said flanges. The two flanges 23, 24 in the first embodiment are aligned parallel to the horizontal separating plane. They can also be aligned vertically instead. The area of half shells 21, 22 forming respective deformation members 14, 15 is formed by transversely projecting half shell wall parts 41 and 42, said parts forming deformation-resistant hollow bodies when the bumper bracket is assembled. Flanges 23, 24 of half shells 21, 22 merge with similar flanges 43 and 44 of half shell wall parts 41 and 42.

The two half shells 21, 22 are made for example from deep-drawn steel or light metal sheet, such as aluminum for example. They can also be made of cast light metal instead. The firm connection of half shells 21, 22 in the vicinity of flanges 23, 24 and 43, 44 is achieved by rivets in particular, especially when half shells 21, 22 consist of aluminum. Half shells 21, 22 can also be connected firmly instead by welding, joining by pressure, gluing, bolting, or the like. Spot, laser, or MAG welding can be used as welding methods. The assembly composed of the two half shells 21, 22 as bumper bracket 13 and deformation members 14, 15 is so designed that deformation members 14, 15 are more resistant to deformation than bumper bracket 13, so that they deform only when additional energy is absorbed after the deformation ability of bumper bracket 13 is exhausted. This deformation behavior is conferred by suitable design of the two half shells 21, 22. In addition, the stiffness under flexure and resistance to change in shape are accomplished by deliberately providing lock beads 25 in half shells 21, 22 and/or by using preferably galvanized reinforcing panels 26 in the vicinity of bumper bracket 13 and/or the two deformation members 14, 15. Reinforcing panels 26 run horizontally for example, inside the separating plane of half shells 21, 22 and in the plane of flanges 23, 24, with the shell walls of bumper bracket 13 that are opposite one another abutting via reinforcing panels 26 for example. In addition, or instead, vertical reinforcing panels or reinforcing parts of another design can be provided in bumper bracket 13 and/or deformation members 14, 15. In the area of deformation members 14, 15 a receptacle, likewise not shown in greater detail, can be provided for a bolted towing support.

In the first embodiment in FIGS. 1 and 2, the two half shell wall parts 41, 42 of half shells 21, 22 that form deformation members 14, 15 are made in the form of lengthwise parts that project from bumper bracket 13 approximately at right angles and point toward side members 11, 12, so that the deformation members are formed as approximately hollow-box-shaped supports. In another embodiment, not shown, these deformation members 14, 15 designed as box-shaped supports can also be modified in such fashion that their cross sections change, increasing or decreasing, over their length. This is indicated in FIG. 2 by the dashed lines, with the cross sections of deformation members 14, 15 tapering from bumper bracket 13 to side members 11, 12 or vice versa. In FIG. 2, the dashed lines also indicate that an impact absorber 27 made of foamed plastic or the like is located on the front of bumper bracket 13, said absorber being mounted for example on flanges 23, 24. Impact absorber 27 reduces impact energy by deforming, and protects bumper bracket 13 against damage in impacts at very low vehicle speeds. After absorbing energy by deformation, impact absorber 27 is able to return to its original state. The bumper is so designed that in impacts at very low vehicle speeds, energy is initially absorbed by deformation of reversible impact absorber 27 located ahead of bumper bracket 13. At higher impact energy levels, bumper bracket 13 initially bends and then deforms. Only higher impact energies are absorbed by deformation of deformation members 14, 15, with side members 11, 12 being deformed only after complete deformation of deformation members 14, 15 and the overloads that follow.

In the second embodiment shown in FIGS. 3 to 7, reference numerals increased by 100 are used for those parts that correspond to those in the first embodiment in FIGS. 1 and 2, so that reference will therefore be made to the description of the first embodiment.

In the second embodiment as well, the two half shells 121, 122 have, on the back, facing side members 111, 112 half shell wall parts integral with half shells 121, 122 and projecting transversely therefrom, with half shell wall parts 141 and 142 forming deformation member 115 in FIG. 6. FIG. 5 shows the other two half shell wall parts 145, 146 forming deformation member 114. With the bumper assembled, half shells 121, 122 form bumper bracket 113, half shell wall parts 141, 142 form one deformation member 115, and half shell wall parts 145, 146 form the other deformation member 114, with deformation-resistant hollow bodies of a special design being provided in both deformation members. It is evident from FIG. 3 that the hollow body cross section tapers from at least both sides toward rear flange 116, 117. Viewed in the other direction, the cross section expands approximately in a V-shape starting at flanges 118, 119. Looking at the cross section of the bumper, starting approximately at the middle of bumper bracket 113 and following its course in FIG. 3 to the right, it is evident that the front and rear wall parts expand to merge with deformation member 115. The special shape of deformation member 114 or 115 can also be described as flared, viewed starting from side members 111, 112 and looking in the direction of bumper bracket 113. Flanges 123, 124 of half shells 121, 122 merge with flanges 143, 144 of half shell wall parts 141, 142, as can be seen in deformation member 115 in FIG. 6. Flanges 123, 124 and 143, 144 in the second embodiment run transversely with respect to the horizontal separating plane, in other words approximately vertically. They fit over one another, with flanges 124 and 144 of lower half shell 122 or of lower half shell wall part 142 being gripped by flanges 123, 143 of upper half shell 121 and upper half shell wall part 141. Flanges 123, 124, 143, 144 are advantageously permanently connected by rivets 147 as shown.

Reinforcing parts can be mounted in bumper bracket 113 and/or deformation members 114, 115 as shown in FIG. 3 by the dashed reinforcing parts 148, 149 in deformation members 114, 115. Bumper bracket 113 has a horizontal reinforcing panel 126 as a reinforcing part, especially in its middle area, said panel running inside the horizontal separating plane and abutting the opposite shell walls, especially flanges 124. Reinforcing panel 126 can have edge parts bent on both sides and internally abutting flanges 124, and be fastened to these edge parts together with flanges 123, 124 by rivets 147. By virtue of reinforcing panel 126, bumper bracket 113 is designed as a two-chambered profile especially in its middle area, as viewed in cross section.

Reinforcing parts 148, 149 in the vicinity of deformation members 114, 115 can be designed as deformation elements aligned in the direction of respective side members 111, 112 and abutting the vehicle body at one end. These reinforcing parts 148, 149 are designed for example as profiles or hollow bodies or as solid bodies or vertical and/or horizontal supporting walls or the like. In FIGS. 3, 5, and 6, in the embodiment shown therein, it is indicated that reinforcing parts 148, 149 can be designed for example as horizontally directed tubular profiles.

In the modified embodiment shown in FIG. 7, reinforcing part 149a is designed as an inverted U-shaped profile whose U-base 150 abuts one half shell wall part 141 and whose U-legs 151, 152 abut the other half shell wall part 142, each in the vertical direction, and are fastened thereto for example by rivets or the like.

In the vicinity of the two deformation members 114, 115, lock beads 125 are deliberately provided above and/or below, running approximately parallel to the direction of bumper bracket 113, by which the deformation characteristic of flared deformation members 114, 115 can be deliberately influenced.

The bumper according to the second embodiment, in the top view according to FIG. 3, has the characteristic of a somewhat lobular design viewed for example looking from the middle of bumper bracket 113 toward an outer side. The arrangement is such that the two half shell wall parts 145, 146 and 141, 142 of half shells 121, 122 that each form deformation members 114 and 115, make a transition from an essentially flat and vertical mounting surface represented by mounting flange 116, 117, initially diagonally or in an arc with convex or concave curvature, to the parts of half shells 121, 122 that form bumper bracket 113. This flaring of each deformation member 114, 115 that proceeds outward from flange 116, 117 as viewed from the front serves as a deformation zone and allows considerable energy absorption by virtue of its relatively large cross section. This energy absorption, because of the large-volume, bending-insensitive design, is largely independent of the direction of the load, in other words definite deformation of deformation members 114, 115 is possible even in diagonal impacts. In summary, the bumper according to the second embodiment is simple in design and therefore economical to manufacture.

In the first embodiment in FIG. 1, widened areas 30 are indicated on half shell flanges 23, 24, said areas having mounting areas 36 for mounting additional vehicle assemblies or the like for example. This is also possible in the second embodiment shown in FIGS. 3 to 7. For example, deformation members 114, 115 can also have a receptacle, not shown in greater detail, for a bolted towing support.

Figure 8:
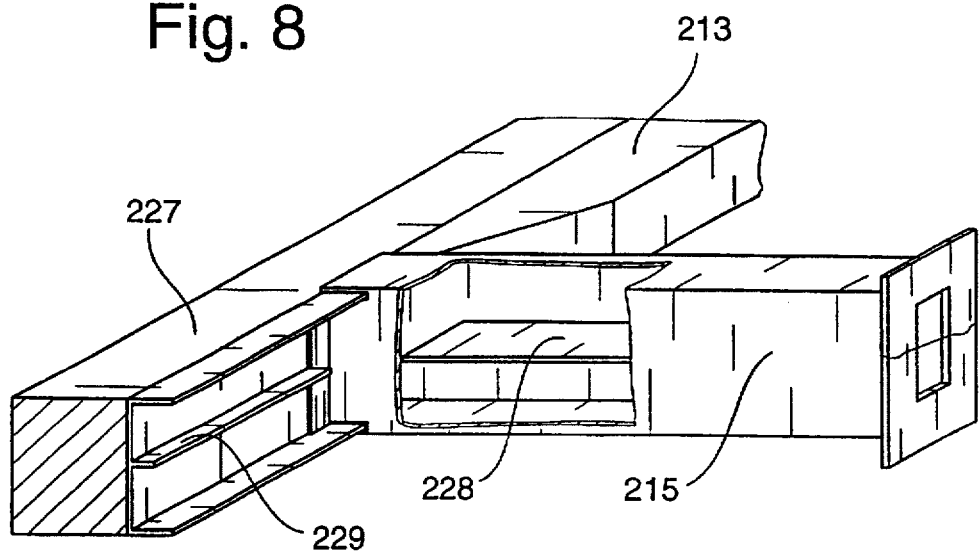
FIGS. 8 and 9 each show, partially cut away, a perspective view of a bumper according to a third and fourth embodiment, respectively.

In the third embodiment shown in FIG. 8, a bumper of a different design is shown in sections. For parts that correspond to the first embodiment, reference numerals that are larger by 200 have been used for the reasons given. In FIG. 8, bumper bracket 213 and the deformation members, of which only deformation member 215 is shown, are each made separately as extrusion-molded profiles and permanently attached to one another, for example by bolting, riveting, gluing, or welding. Bumper bracket 213 is designed in the middle area as a closed box profile and in the end areas as a U-profile open to the vehicle body. Impact absorber 227 made of foamed plastic is fastened to the front of bumper bracket 213, facing away from the vehicle body. Deformation members 215 are likewise designed as extrusion-molded box profiles, with reinforcing ribs 228 possibly being provided to influence the resistance under flexure and resistance to changing shape, said ribs running horizontally in the installation position of the bumper and abutting two opposite profile walls. In order to produce a homogeneous deformation process and to reduce the initial peak force on folding, reinforcing ribs 228 are cut back in the connection area to bumper bracket 213, in other words they end at a distance from the end of deformation member 215 mounted on bumper bracket 213. Bumper bracket 213 is made with a centrally located horizontal lengthwise rib 229.

Figure 9:
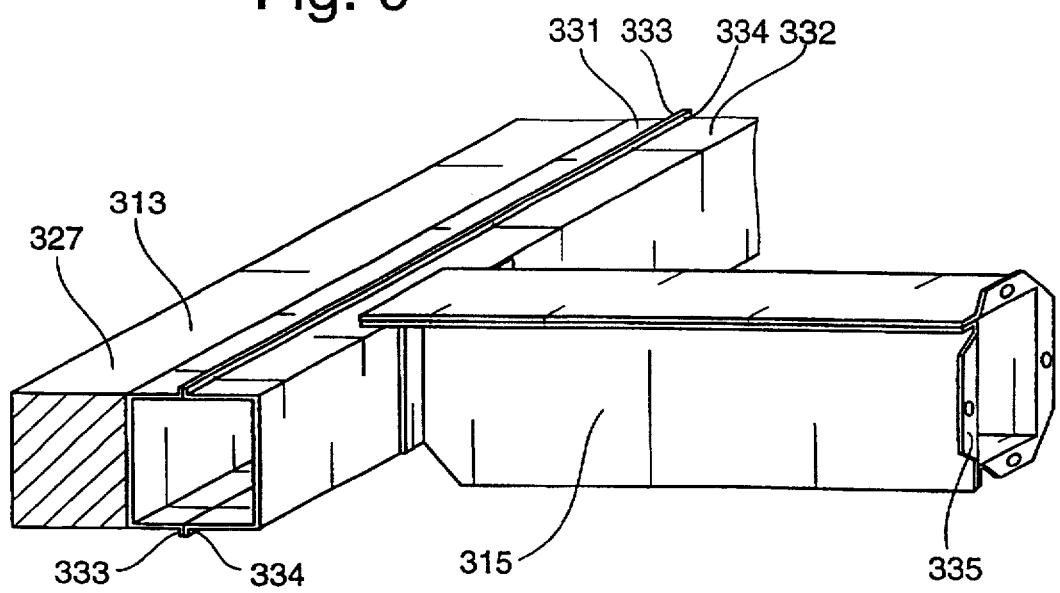

FIG. 9 shows a fourth embodiment of a bumper, in section and in perspective. Bumper bracket 313 here is composed of two identical half shells 331, 332, which in the mounting position rest against one another by vertical flanges 333 and 334 along a vertical separating plane and are firmly connected to one another by means of said flanges. The two deformation members, of which only deformation member 315 is shown in FIG. 9, are designed as box profiles that consist of a U-shaped profile section with a closing panel and are fastened endwise to half shell 332 that faces the vehicle body by welding, riveting, bolting, gluing, or the like. Double tabs 335 are provided at the free ends of deformation members 315 and serve to receive the bolt connections to the side members.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A bumper for a vehicle body having two side members, said bumper having a bumper bracket extending over the width of the vehicle body and two deformation members mounted at a distance from one another on a back side of the bumper bracket facing the vehicle body, said deformation members being made more resistant to deformation than the bumper bracket so that they deform only after the bumper bracket has deformed, wherein the bumper bracket is assembled from half shells which abut one another within a separating plane that extends essentially horizontally in a mounted position and which are connected to one another by flanges, and wherein the half shells each have half shell wall parts facing the vehicle body which form the two deformation members, said half shell wall parts being made in one piece with the half shells and projecting transversely therefrom, and said half shell wall parts forming hollow bodies integral with the bumper bracket and resistant to deformation when in the mounted position.

2. A bumper according to claim 1, wherein the half shells are essentially identical.

3. A bumper according to claim 1, wherein the flanges of the half shells merge with flanges of the half shell wall parts and wherein the flanges of the half shells and the flanges of the half shell wall parts extend transversely with respect to the separating plane.

4. A bumper according to claim 1, wherein the half shells comprise an upper half shell and a lower half shell, and wherein flanges of the upper half shell fit over flanges of lower half shell.

5. A bumper according to claim 3, wherein the half shells comprise an upper half shell and a lower half shell, and wherein flanges of the upper half shell fit over flanges of lower half shell.

6. A bumper according to claim 1, wherein the flanges are connected together by rivets.

7. A bumper according to claim 1, wherein the flanges are connected together by at least one of spot welding, laser welding, MAG welding, joining under pressure, gluing, or bolting.

8. A bumper according to claim 1, wherein the half shells are made of a light-weight sheet metal or cast metal.

9. A bumper according to claim 1, wherein reinforcing parts are located in at least one of the bumper bracket and the deformation members.

10. A bumper according to claim 9, wherein a horizontal reinforcing part is located in the bumper bracket, said reinforcing part extending within the separating plane and abutting opposite shell walls of the half shells.

11. A bumper according to claim 9, wherein the bumper bracket has a two-chambered cross-sectional profile.

12. A bumper according to claim 10, wherein the bumper bracket, has a two-chambered cross-sectional profile.

13. A bumper according to claim 9, wherein reinforcing parts are designed in the area of deformation members as deformation elements, said deformation elements being aligned in the direction of respective side members and abutting the vehicle body at one end.

14. A bumper according to claim 9, wherein reinforcing parts are designed as one of profiles, hollow bodies, solid bodies, or vertical and horizontal supporting walls.

15. A bumper according to claim 13, wherein reinforcing parts are designed as one of profiles, hollow bodies, solid bodies, or vertical and horizontal supporting walls.

16. A bumper according to claim 14, wherein reinforcing parts are designed as horizontally directed tubular profiles.

17. A bumper according to claim 12, wherein reinforcing parts are designed as U-shaped or inverted-U-shaped profiles, whose U-base abuts one half shell wall part and whose U-legs abut the other half shell wall part in the vertical direction, and are directed toward the respective side member.

18. A bumper according to claim 1, wherein lock beads are provided in the half shells.

19. A bumper according to claim 1, wherein the half shells have lock beads on at least one of the top side and the bottom side in the area of the deformation members, said lock beads extending approximately parallel to the bumper bracket.

20. A bumper according to claim 1, wherein the bumper has an approximately lobular design, as viewed from above in a direction from the middle of the bumper bracket toward one outer side.

21. A bumper according to claim 1, wherein the half shell wall parts of the half shells that form the deformation member are flared from a mounting surface that runs essentially flat and vertically and serves for mounting to the ends of the side members.

22. A bumper according to claim 1, wherein the half shell wall parts of the half shells that form the deformation member make a transition diagonally or in an arc with convex or concave curvature to the parts of half shells that form the bumper bracket.

23. A bumper according to claim 1, wherein the half shell wall parts of the half shells that form the deformation members are designed as lengthwise parts projecting approximately at right angles and pointing toward the vehicle body, said parts having a box profile.

24. A bumper for a vehicle body having two side members, said bumper having a one-piece bumper bracket extending over the width of the vehicle body and two one-piece deformation members mounted at a distance from one another on a back side of the bumper bracket facing the vehicle body, said deformation members being made more resistant to deformation than the bumper bracket so that they do not deform to absorb additional energy until the bumper bracket has fully deformed, wherein the bumper bracket and the deformation members are each made as extrusion-molded profiles and wherein the extrusion-molded profiles are connected directly together by one of bolting, riveting, gluing, or welding.

25. A bumper for a vehicle body having two side members, said bumper having a bumper bracket extending over the width of the vehicle body and two deformation members mounted at a distance from one another on a back side of the bumper bracket facing the vehicle body, said deformation members being made more resistant to deformation than the bumper bracket so that they do not deform to absorb additional energy until the bumper bracket has fully deformed, wherein the bumper bracket and the deformation members are each made as extrusion-molded profiles and wherein the extrusion-molded profiles are connected together by one of bolting, riveting, gluing, or welding, wherein the bumper bracket is made in a middle area as a closed box profile and is formed in end areas as a U-profile that opens toward the vehicle body.

26. A bumper according to claim 25, wherein at least one of the box profile and the U-profiles are provided with reinforcing ribs aligned horizontally in a mounted position, said ribs abutting two opposite profile walls of the at least one of the box profile and the U-profiles.

27. A bumper for a vehicle body having two side members, said bumper having a bumper bracket extending over the width of the vehicle body and two deformation members mounted at a distance from one another on a back side of the bumper bracket facing the vehicle body, said deformation members being made more resistant to deformation than the bumper bracket so that they do not deform to absorb additional energy until the bumper bracket has fully deformed, wherein the bumper bracket and the deformation members are each made as extrusion-molded profiles and wherein the extrusion-molded profiles are connected together by one of bolting, riveting, gluing, or welding, wherein the profiles are provided with reinforcing ribs aligned horizontally in a mounted position, said ribs abutting two opposite profile walls of the profiles.

28. A bumper according to claim 27, wherein the reinforcing ribs in the profile of the deformation members are cut back in an area where they connect to the bumper bracket, terminating at a distance from the end of the profile.

* * * * *